Nov. 29, 1966 N. J. WASILESKI 3,289,142

MULTI-PHASE PANEL ASSEMBLY AND PLUG-IN CONTACT ASSEMBLY THEREFOR

Original Filed Dec. 5, 1963 2 Sheets-Sheet 1

INVENTOR:
NORBERT J. WASILESKI,
BY Irving B. Marshman
ATTORNEY

INVENTOR:
NORBERT J. WASILESKI,
BY Irving B. Marshman
ATTORNEY 3,289,142

MULTI-PHASE PANEL ASSEMBLY AND PLUG-IN CONTACT ASSEMBLY THEREFOR

Norbert J. Wasileski, Farmington, Conn., assignor to General Electric Company, a corporation of New York
Continuation of application Ser. No. 328,232, Dec. 5, 1963. This application Mar. 30, 1966, Ser. No. 552,656
9 Claims. (Cl. 339—22)

This case is a continuation of application Serial Number 328,232, filed December 5, 1963, now abandoned. This invention relates to multi-phase type electrical control panel assemblies and to stab-type plug-in contact members for use therein.

Electrical control panel assemblies of the type referred to comprise a basic support or housing and a plurality, usually three, main power bus bars supported therein, together with a plurality of separately housed electrical control assemblies or "units" removably supported therein and housing plug-in type contacts making electrical connection to said bus bars respectively.

In accordance with the prior art, such bus bars have been arranged in parallel side-by-side relation, and such contacts have comprised either (1) "clothespin" type contacts straddling a portion of each bus bar, or (2) resilient elongated contact stabs inserted into holes provided in such bus bars.

The "clothespin" type arrangement has the disadvantage that the optimum use of this type of contact that the bars be arranged with their narrow edges facing the direction of approach of the contact member. This causes the bars to be more readily subject to distortion by short-circuit forces. In addition, insulation problems between bus bars of differing phase relation are accentuated.

The resilient-stab-and-hole approach has the disadvantage that it requires punching of holes in the bus bars, which is expensive and which also weakens the bars. Moreover, the location of such holes limits the placement of control units in the assembly.

It is an object of this invention to provide a multi-phase panel assembly including a plurality of bus bars and control units making plug-in type contact therewith wherein the bus bars do not require special modification at the plug-in contact points and which permits use of strap-like bus bars in parallel spaced relation with either narrow or wide faces adjacent each other and which does not present difficult insulation problems.

It is a further object of the invention to provide a control panel assembly of the type described including "unmodified" bus bars and in which high contact pressure can be achieved.

In accordance with the invention in one form, a multi-phase panel assembly is provided including a plurality of bus bars in parallel spaced generally co-planar relation, and removable control unit assemblies having a plurality of compound "stab-type" contact assemblies projecting from the rear wall thereof. Each compound stab-type contact assembly includes a pair of elongated conductive contact members in spaced parallel or "back-to-back" relation, and resilient spring means therebetween urging them apart. The elongated conductive members in back-to-back relation are electrically insulated from each other and each pair is disposed to be inserted between a predetermined pair of bus bars so that the contact members are forced toward each other by contact with the bus bars, thus providing good contact pressure with the bus bars.

In accordance with another aspect of the invention, three bus bars are utilized, and two compound contact assemblies are provided, inserted in the two spaced between the bars respectively. Each contact of each pair contacts only one bus bar, but the central bus bar is contacted by a contact of each pair.

In accordance with another aspect of the invention a rigid insulating projection or barrier extends between the contact members of each pair and the resilient means comprises a pair of compression springs, one being positioned between the insulating barrier and each contact member, in aligned back-to-back relation.

In a more detailed aspect of the invention, the stabs and base are constructed to act as a large pilot pin or "bullet." This is accomplished by bending the free ends of the stabs toward each other and elongating the uprights of the base to protrude beyond the ends of the stabs.

For a better and more complete understanding of the invention, reference should now be made to the following specification and to the accompanying drawings of which:

Figure 2:
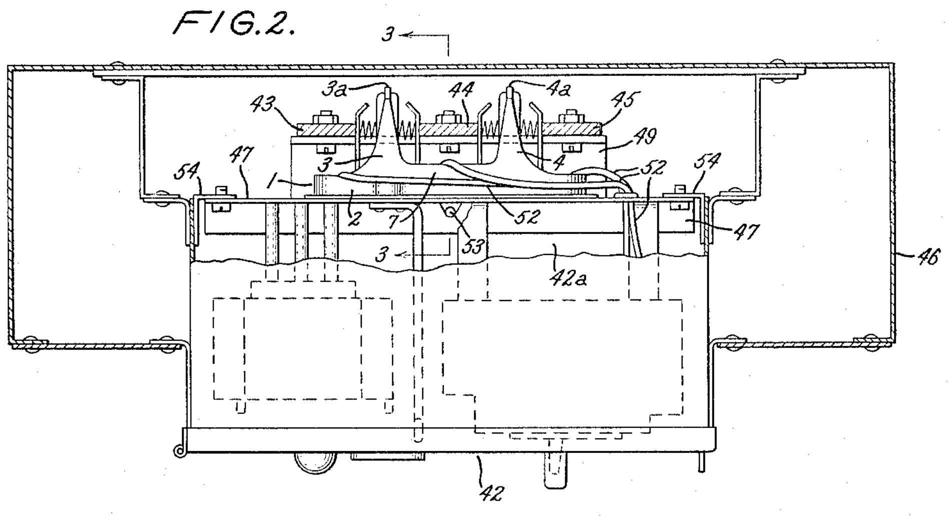
FIGURE 2 is a view taken along the line 2—2 of FIG. 1 showing a control unit embodying the invention mounted in place in the apparatus of FIGURE 1.
Figure 1:
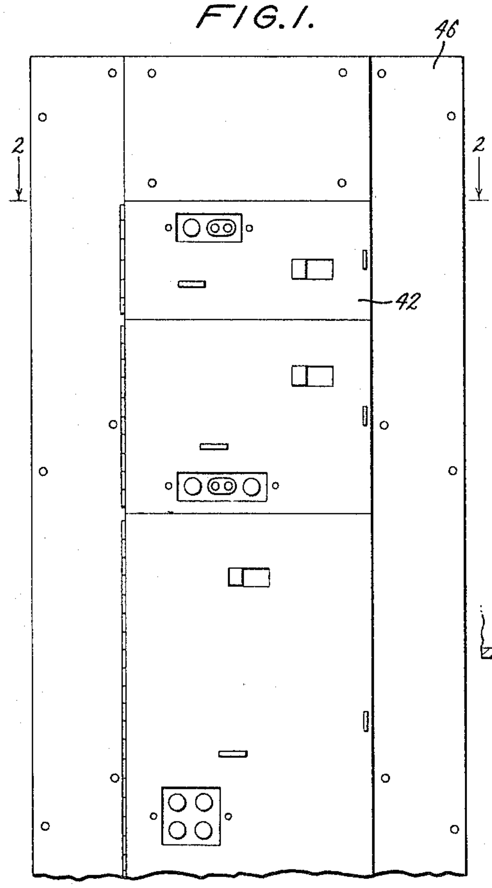
FIGURE 1 is a view in elevation of electrical apparatus such for example, as a motor control center comprising a number of separate control units each embodying the invention.
Figure 3:
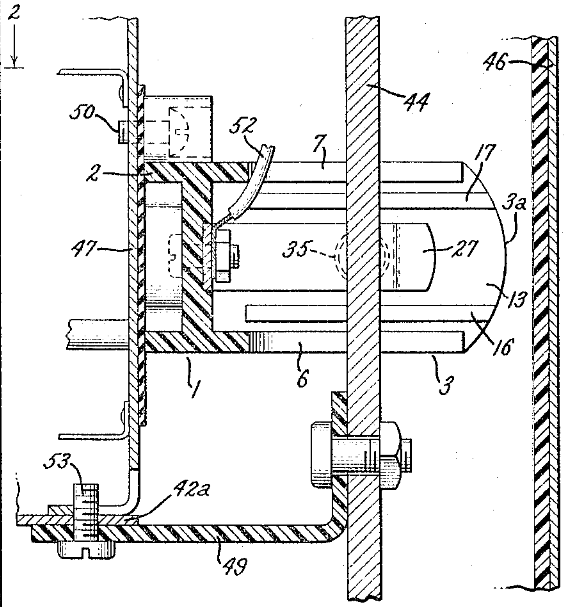
FIGURE 3 is a fragmentary sectional view taken along the line 3—3 of FIG. 2 illustrating the mounting of one of the control units in the apparatus cabinet of FIG. 1.

Referring now to the drawings, the stab contact assembly comprises a stab contact supporting member 1 that has a base portion 2 and a pair of upright members 3 and 4 which, preferably, are integral with the base portion. The supporting member 1 may be made of any suitable insulating material. For example it may be molded from a wood flour filled phenolic plastic molding compound.

The base portion 2 of the support has a generally oblong configuration that is to say its length is substantially greater than its width. As shown, it may be provided with rounded ends. In cross section, the base portion has a general channel shaped configuration comprising a bottom member 5 and two lateral flanges or side walls 6 and 7. Triangularly configured perpendicular extensions 8 and 9 of flanges 6 and 7 constitute the supporting sidewalls of upright member 3 and similarly configured extensions 10 and 11 constitute the sidewalls of upright member 4. Bridging the space between sidewalls 8 and 9 of upright 3 is an integral web member 13 which is provided on one flat surface with a pair of integrally molded stiffening ribs 14 and 15 and on the opposite flat surface with a corresponding pair of integrally molded stiffening ribs 16 and 17. The ribs 14, 15, 16 and 17 also provide electrical clearance between contacts. Upright member 4 has a similar construction; it has a web member 13*a* bridging the sidewalls 10 and 11 together with integrally molded stiffening ribs 18, 19, 20, and 21.

The channel bottom 5 of the base portion is not continuous; it is provided with openings 22, 23, 24 and 25 which are formed in the molding operation. The inner surface of the portions that constitute the bottom of the channel 5 are provided with aligned longitudinal grooves 5*a*, 5*b* and 5*c*. Mounted in these grooves are a plurality of pairs of L shaped cantilever contacts, one pair associated with each of the uprights 3 and 4. Thus, contacts 26 and 27 are associated with upright 3 and contacts 28 and 29 are associated with upright 4. These contacts are fairly stiff but possess sufficient resilience to provide for movement of their free ends when mounted as cantilevers. They may be made of a strip of any good electro conductive material such as copper, silver, or aluminum or base alloys thereof. The cross sectional area of the strips will depend upon the magnitude of the currents which they are designed to conduct.

The base leg portions of the L shaped contact strips serve as mounting feet and are provided with holes through which bolts or other suitable fastening means may be passed. Wiring terminals may be fastened to the contacts by these bolts or other suitable fastening means. The upright legs of the L shaped strips serve as stabs. As shown, their free end portions are bent out of the planes of the upright legs at an angle of intermediate value of approximately 45 degrees.

Figure 5:
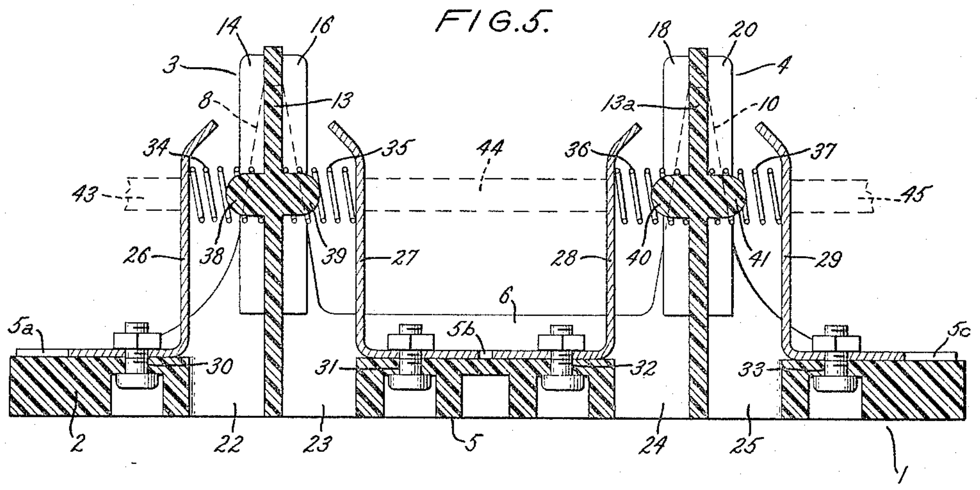
FIGURE 5 is an elevation view in section taken on the line 5—5 of FIGURE 4.

In assembly the stab unit, the two L shaped conductive strips associated with each of the base uprights 3 and 4 are mounted as cantilevers on opposite sides of the associated upright with their bent over free end portions extending toward each other to provide converging outer surfaces as illustrated most clearly in FIG. 5.

Figure 4:
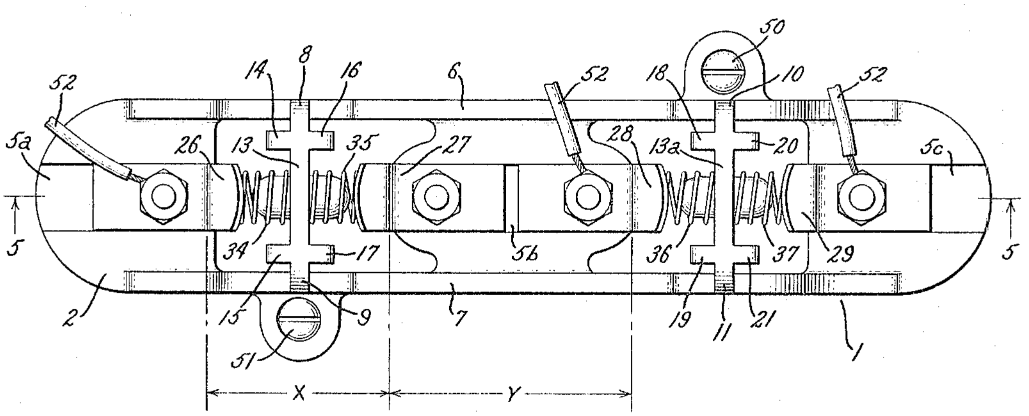
FIGURE 4 is a plan view of a male stab unit embodying the invention.

For the purpose of securing these stab contacts in predetermined correct positions, holes 30, 31, 32 and 33 are provided in the mounting base. These holes are located in the grooves *5a*, *5b* and *5c* with their centers on the longitudinal center line thereof as best illustrated in FIGURES 4 and 5. Resilient means illustrated as coil springs 34, 35, 36 and 37 are mounted between each of the stab contacts 26, 27, 28 and 29 respectively and the bridging web 13 or 13*a* of the associated upright 3 or 4. Integral spring positioning protuberances 38, 39, 40 and 41 are positioned on the flat surfaces of the web at a point such that the opposite ends of the springs bear against the upright legs of the cantilever stab contacts in the region immediately adjacent the line of the bend of the bent over free end portions thereof. These springs are in compression so that they yieldingly resist movement of the free end of the cantilever stabs toward the associated base upright 3 or 4.

The stab contact assembly may be used for connecting electrical apparatus such as a motor starter mounted within an enclosure 42 to bus bars 43, 44 and 45 mounted within a suitable enclosure such for example as the sheet steel enclosure 46 of a power panelboard or switchboard. A removable plate 47 having an L shaped cross section constitutes the rear wall of enclosure 42 and serves as a movable saddle member upon which electrical apparatus such as a motor starter, circuit breaker, disconnect, or the like, is mounted. The buses 43, 44 and 45 may be the A phase, B phase and C phase buses respectively of a three phase distribution system. They are supported within the enclosure 46 by means of an L shaped bus support member 49 which is suitably secured to the bottom or floor 42*a* of enclosure 42. As shown, the bus bars are mounted near the rear wall of the enclosure 46 in coplanar, spaced apart parallel edge to edge relationship.

The base portion 2 of the stab assembly is secured in a predetermined position of the saddle member 47 by suitable fastening means such as bolts 50 and 51. Electrical connections from the electrical components within the enclosure 42 to the wiring terminals of the stab contacts are made by means of electrical conductors 52 which are brought out through the rear wall of the enclosure. In order that the stab contacts, when stabbed on the bus bars, shall bear forcefully against them, the stab contacts must be correctly prepositioned on the stab base. This is accomplished by positioning the mounting bolt holes 30, 31, 32 and 33 in the insulating stab base so that in the undeflected cantilever positions of the stab contacts 26, 27, 28, and 29 the distance between outside surfaces of the contacts of each of the pairs is slightly greater than the distance between adjacent bus bars. Also, the positioning of the holes is such that in the undeflected positions of the stab contacts the distance Y between the outside surfaces of the inside contacts (such as 27 and 28) of adjacent pairs is slightly less than the width of the broad faces of the bus bars 43, 44 and 45.

To connect a unit of apparatus such as motor starter 42 to the bus bars 43, 44 and 45 the saddle 47 with the starter mounted thereon is placed on the floor 42*a* of enclosure 42 with the stab contacts properly aligned with the spaces between bus bars. The saddle unit is then slid toward the rear wall of the enclosure 46. The portions of the stab contacts that are bent at 45 degrees serve as pilot pins to guide the stabs into position. This eliminates the need for guides. Even though some initial misalignment of the stabs with the spaces between the bus bars is present, the stab supporting unit will be correctly positioned as it is inserted. The stabs become deflected as the tapering end portions enter the spaces between bus bars. As the stabs are deflected, the springs 33, 34, 35 and 36 are compressed and exert force against the stabs which in turn exert force against the bus bars.

In the fully inserted positions, the parallel portions of the stab contacts are in engagement with the narrow edge surfaces of corresponding bus bars. Specifically, the stab contact 26 engages the inside narrow edge surface of the A phase bus bar 43. Similarly, stab contact 29 engages the inside narrow edge surface of the C phase bus bar 45. Stab contacts 27 and 28 engage the narrow edge surfaces of the B phase bus bar 44. The wiring terminals of stab contacts 26 and 29 and the wiring terminal of either one of the contacts 27 or 28 are connected to corresponding appropriate apparatus terminals within the enclosure 42. The stab contact whose wiring terminal is not connected electrically does not serve as an electrical contact. It serves the mechanical functions of guiding and positioning. In the fully inserted position of the stab contacts, the saddle 47 upon which the stab assembly is mounted engages stops 53 and 54.

It will be noted that the noses 3*a* and 4*a* of the insulating upright members 3 and 4 extend well beyond the ends of the stab contact members. This provides a safety measure since the noses would strike the rear wall of the metallic enclosure 46 before the stab contacts could do so. Thus they prevent the stab contacts from coming in contact with the rear wall and this ensures that electrical clearance between the stabs and the enclosure is always maintained.

Figure 6:
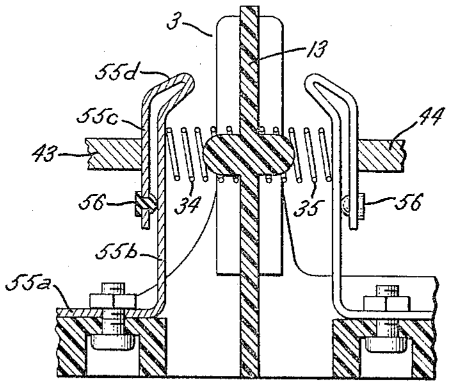
FIGURE 6 is a fragmentary view of a modification.

A modification of the invention for use in distribution systems with high values of available current is illustrated in FIG. 6. It differs from the modification of FIGS. 1 to 5 primarily in that the stab contacts are constructed to provide, in effect, a loop having two adjacent sides or legs in which current flows in opposite directions. As illustrated in FIG. 6 the modified stab contact is generally L shaped. It has a base leg 55*a* and an upright leg 55*b* of which a substantial portion is returned on itself to provide a contact portion 55*c* and a portion 55*d* extending at an angle of approximately 45 degrees therefrom. The portion 55*c* engages the narrow face of bus bar 43. The contact loading spring 34 is mounted between the upright leg 55*b* and the insulating upright 3. For the purpose of separating the adjacent sides of the loop from each other, suitable insulating means 56 is provided. This may be a rivet made of nylon or other suitable insulating material.

In operation current entering the loop at the contact portion 55*c* leaves at the wiring terminal portion 55*a*. Thus the current is in one direction (up) in the side of the loop comprising portions 55*c* and 55*d* and is in the opposite direction (down) in the upright leg 55*b*. Current in the loop produces forces tending to spread or expand the loop. As a result, the loading spring 33 will be further compressed and the contact portion 55*c* will be pressed against the narrow face of the bus bar with a pressure that increases with the strength of the current. This counteracts the forces which tend to force the stab contacts out of engagement with the bus bars under conditions of heavy current, e.g., under short circuit conditions.

Alterations and modifications will readily occur to persons skilled in the art without departing from the true spirit of the invention or from the scope of the annexed claims.

What I claim as new and desire to secure by Letters Patent of the United States is:

1. A three-phase electrical apparatus assembly comprising:

(a) a main enclosure;

(b) at least three electrically separate power bus bars supported in insulated relation in said enclosure in parallel spaced-apart generally co-planar relation, each for connection to a different phase of a three-phase power system and each mutually adjacent pair of said bus bars defining an elongated space therebetween defined by mutually confronting portions of said adjacent pair of bus bars;

(c) an electrical control unit supported on said main enclosure, said control unit comprising a control unit enclosure for enclosing and supporting electrical control apparatus, said control unit enclosure including a back wall extending generally parallel to said power bus bars;

(d) at least two pairs of adjacent electroconductive strips supported on said control unit and extending outwardly from said back wall thereof substantially perpendicular to said back wall;

(e) each of said pairs of electroconductive strips extending into one of said spaces between a pair of said bus bars;

(f) each of said strips of each of said pairs having a portion thereof resiliently held in electrical engagement with a different one of said bus bars;

(g) means electrically insulating each strip of each pair of said pairs from said control unit enclosure and from the other one of said strips comprising said pair, and (h) at least three electrical connectors in said control unit enclosure each connected to a corresponding different one of said electroconductive strips for connecting three electrical conductors in said control unit enclosure each to a different one of said phase bus bars.

2. A three-phase electrical apparatus assembly as set forth in claim 1, said panel assembly also comprising spring means between each pair of said electroconductive strips resiliently biasing said strips away from each other, and insulating means preventing the flow of electric current between said pairs of strips through said spring means.

3. A three-phase electrical apparatus assembly as set forth in claim 1, said panel assembly also comprising insulating barrier means extending between each of said pair of adjacent electroconductive strips, said barrier means being dimensioned to interrupt all straight-line through-air electrical paths between said members of said pair.

4. A three-phase electrical apparatus assembly as set forth in claim 3, said barrier means extending substantially beyond said outer ends of said electroconductive strips.

5. A male stab contact assembly comprising in combination:

(a) a contact supporting member of insulating material comprising a generally oblong base portion and a plurality of upright members spaced apart on the longitudinal axis of said base portion;

(b) a plurality of pairs of electroconductive strips each pair associated with a corresponding one of said upright members;

(c) the strips of each pair being mounted as cantilevers on said base portion on opposite sides of the associated upright member in spaced apart relationship therefrom and extending generally parallel thereto, and (d) resilient means mounted between each strip and its associated upright member in the vicinity of the free end of each strip, said resilient means resisting movement of the end portions of said strips toward said upright members.

6. A male stab contact assembly for insertion into the spaces between adjacent parallel bus bars comprising in combination:

(a) a contact supporting member of insulating material comprising a generally oblong base portion and a plurality of upright members spaced apart on the longitudinal axis of said base portion;

(b) a plurality of pairs of electroconductive strips each pair associated with a corresponding one of said upright members;

(c) the strips of each pair being mounted as cantilevers on said base portion on opposite sides of the associated upright member in spaced apart relationship therefrom and extending generally parallel thereto;

(d) the free ends of the strips of each of said pairs being bent toward each other to provide guidance of each of said pairs of strips into a corresponding space between adjacent bus bars, and (e) resilient means mounted between each strip and its associated upright member resisting movement of the free end portions of said strips toward said upright members.

7. A male stab contact assembly for insertion into the spaces between the narrow lateral faces of a plurality of flattened bus bars arranged in parallel spaced apart edge to edge relationship comprising in combination:

(a) a contact supporting member of insulating material comprising a generally oblong base portion and a plurality of upright members spaced apart on the longitudinal axis of said base portion;

(b) a plurality of pairs of electroconductive strips each pair associated with a corresponding one of said upright members;

(c) the strips of each pair being mounted as cantilevers on said base portion on opposite sides of the associated upright member in spaced apart relationship therefrom and extending generally parallel thereto;

(d) the free ends of said upright members extending a substautial distance beyond the free ends of said strips to provide clearance for said strips, and (e) resilient means mounted between each strip and its associated upright member in the vicinity of the free end of each strip, said resilient means resisting movement of the free end portions of said strips toward said upright members.

8. A male stab contact assembly for insertion into the spaces between the edges of a plurality of flattened bus bars arranged in parallel spaced apart edge to edge relationship comprising in combination:

(a) a contact supporting member of insulating material having a generally oblong base portion and a plurality of upright members spaced apart on the longitudinal axis of said base portion;

(b) a plurality of pairs of L shaped electroconductive strips each pair associated with a corresponding one of said upright members;

(c) the strips of each pair being mounted as cantilevers on opposite sides of the associated member with the base portion of each L shaped strip secured to the base portion of said contact supporting member and with the leg portion of each L shaped strip extending generally parallel to the associated upright portion;

(d) equal portions of the free ends of the strips of each of said pairs being bent toward each other to provide guidance of each of said pairs of strips into a corresponding space between adjacent bus bars, and (e) a coil spring mounted between each of said strips and its associated upright member resisting movement of the end portions of said strips toward said upright members.

9. A male stab contact assembly for insertion into the space between the narrow lateral faces of a plurality of flattened bus bars arranged in parallel edge to edge spaced apart relationship comprising in combination:

(a) a contact supporting member of insulating material comprising a generally oblong base portion and a pair of upright members generally perpendicular to the base portion and spaced apart on the longitudinal axis thereof;

(b) a plurality of pairs of electroconductive strips each pair associated with a corresponding one of said upright members;

(c) the strips of each pair being mounted as cantilevers on said base portion on opposite sides of the associated upright member in spaced apart relationship therefrom and extending generally parallel thereto;

(d) each of said strips having its free end portion bent and returned generally parallel to the remaining portion thereof to provide an elongated loop having two sides adjacent each other in which current flows in opposite directions, and (e) a coil spring mounted between a leg of each of the loop members and the associated upright member resisting movement of the closed end portions of said loop members toward said upright members.

References Cited by the Examiner

UNITED STATES PATENTS

| | | | |
|---|---|---|---|
| 1,103,991 | 7/1914 | Murray | 339—176 X |
| 2,262,067 | 11/1941 | Togesen et al. | 339—22 X |
| 2,968,781 | 1/1961 | Staskowski | 339—22 |
| 3,086,191 | 4/1963 | Olashaw | 339—196 |
| 3,126,240 | 3/1964 | Christensen et al. | 339—22 |
| 3,126,241 | 3/1964 | Papalas | 339—22 |

EDWARD C. ALLEN, *Primary Examiner.*

PATRICK A. CLIFFORD, *Examiner.*